Oct. 28, 1952  C. T. DICKEY  2,615,207
PROCESS FOR THE PRODUCTION OF NONMETALLIC ROLLS
Filed April 18, 1950  2 SHEETS—SHEET 1
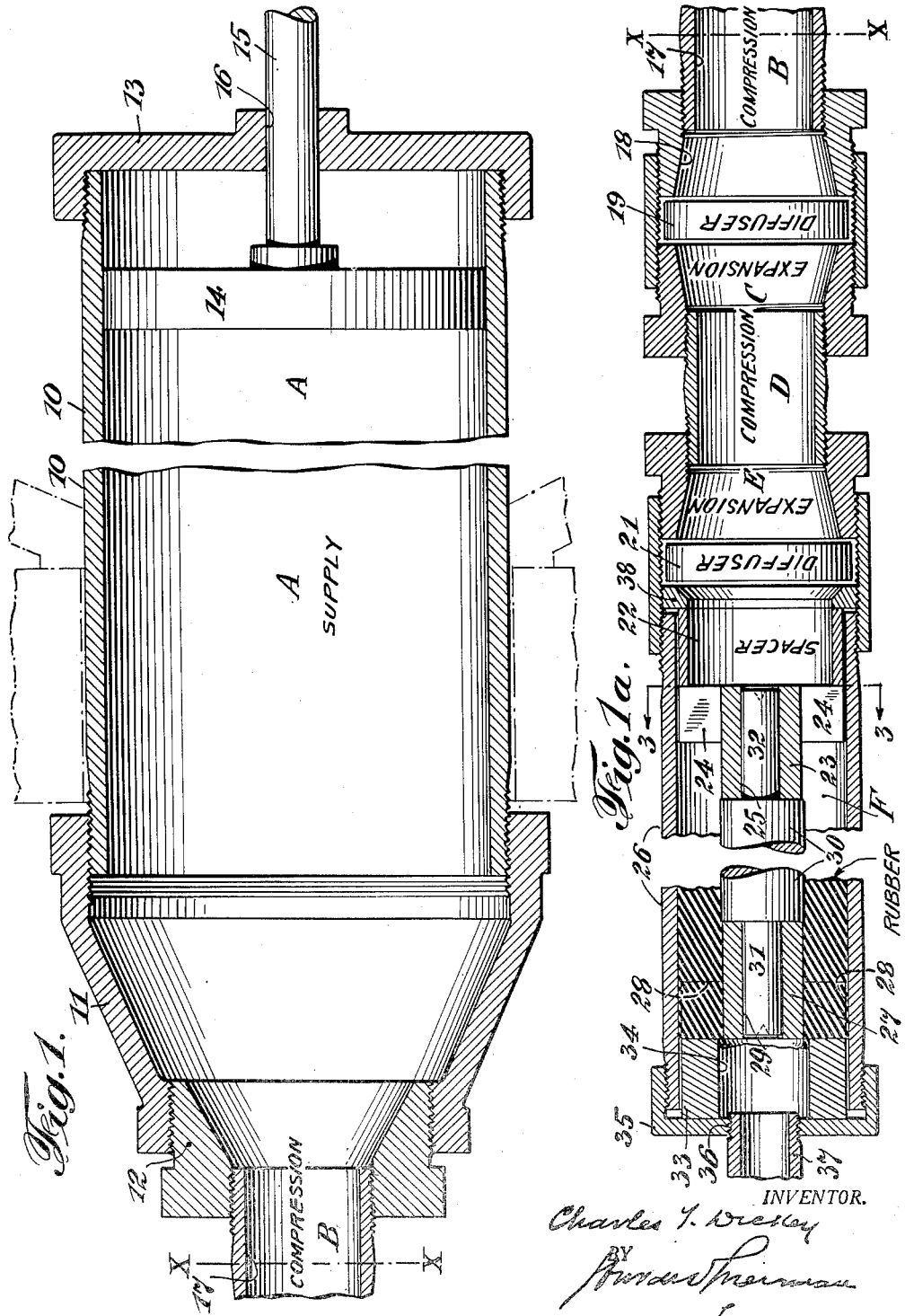
INVENTOR.
Charles T. Dickey
BY
his ATTORNEY Oct. 28, 1952 C. T. DICKEY 2,615,207
PROCESS FOR THE PRODUCTION OF NONMETALLIC ROLLS
Filed April 18, 1950 2 SHEETS—SHEET 2
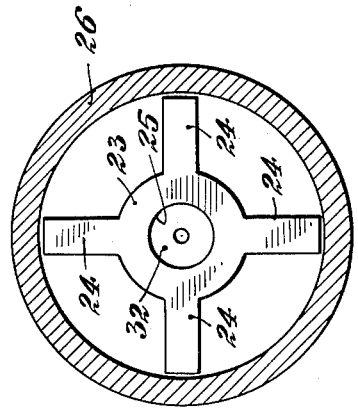
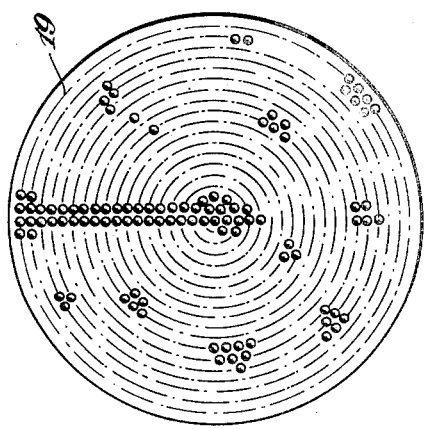
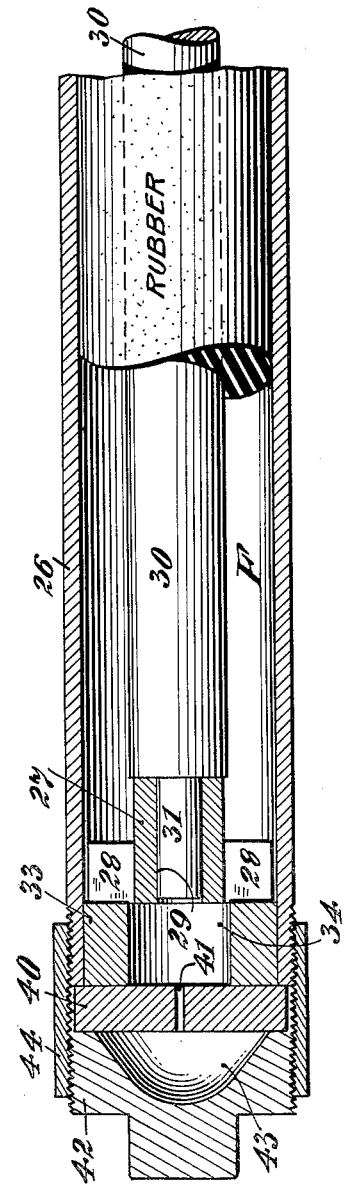
INVENTOR.
Charles T. Dickey
BY
ATTORNEY Patented Oct. 28, 1952

2,615,207

UNITED STATES PATENT OFFICE 2,615,207

PROCESS FOR THE PRODUCTION OF NONMETALLIC ROLLS

Charles T. Dickey, Westfield, N. J.

Application April 18, 1950, Serial No. 156,630

3 Claims. (Cl. 18—48)

My invention relates to non-metallic rolls and refers particularly, without limitation, however, to rubber rolls adapted for use in printing and for similar uses.

Rubber and similar rolls are produced by covering a metal core with rubber, and difficulty has been experienced in producing such rolls possessing the physical properties necessary for satisfactory results.

Rolls of this character must have uniform density and be free from surface or interior pockets and the outer surface must be absolutely smooth, if superior and satisfactory results are to be obtained, as the least unevenness will produce inferior results.

The usual method of producing molds of this character is to force a rubber mix into a mold, or molding chamber, to form a layer, or deposit, of rubber around and upon an elongated metal core.

As the rubber mix is in paste form it contains a considerable amount of entrained air, a large proportion of which is in the produced roll, thus causing it to have varying degrees of density and producing a pitted surface as the air is forced outwardly during the roll-forming process.

One of the objects of my invention is to remove substantially all or the greater quantity of air in the rubber mix before it reaches the molding chamber, thus producing a roll of practically uniform density and having a smooth and unpitted surface, without the necessity of buffing it before its practical application.

I accomplish this desirable result by submitting the rubber mix to a series of expansions, compressions and dispersions before it reaches the molding chamber, during which processes, the air set free by such several treatments being constantly withdrawn, or sucked, from the rubber mix as rapidly as it is exuded therefrom by such physical treatments.

By following the above desired operations and by the use of my described apparatus, I am able to produce rubber rolls free from the disadvantages of former processes to which I refer, and which can be employed for the production of more superior printings without the necessity of buffing the rolls, and which rolls, because of this uniform density, can be used satisfactorily for a much longer time than the mentioned previous rolls.

In the accompanying drawings in which I illustrate one form of a device adapted for employment of my process similar parts are designated by similar numerals.

Figs. 1 and 1a are vertical sections of one form of a device suitable for the following of my process for the molding of rubber rolls.

Fig. 2 is a face view of a dispersing element employed with the device of Fig. 1 somewhat enlarged.

Fig. 3 is a sectional view of a spider employed with the device of Fig. 1 taken on the line 3—3 of Fig. 1a in enlarged scale.

Fig. 4 is a broken vertical section of my device adapted for the ageing or vulcanizing of a rubber roll by my process.

The particular form of a device of my invention shown in the accompanying drawings, particularly Figs. 1 and 1a, comprises a supply chamber A having the cylindrical side 10, the truncated pyramidal sides 11 and 12. Within the supply chamber A there is a piston 14 having a piston rod 15 movable through an opening 16 in the end member 13. The piston is reciprocally movable within the chamber A by suitable power means not shown.

The supply chamber A opens into a contraction chamber B of smaller diameter and capacity than the supply chamber A and having the cylindrical side member 17, which is connected with an expansion chamber C having a side member 18 of outwardly flared truncated pyramidal formation.

The expansion chamber C abuts upon a diffusing member 19, which is a foraminated plate, as clearly seen in Fig. 2, having a plurality of small holes 20, 20 therethrough.

The diffuser 19 leads into a second chamber comprising a centrally positioned portion having a contraction chamber D and an expansion chamber E.

The expansion chamber E abuts upon a second diffuser 21, similar to the diffuser 19.

The diffuser 21 abuts upon an annular cylindrical spacer 22.

The cylindrical spacer 22 abuts upon a spider 23, having a plurality of radiating arms 24, 24, and an opening 25 therethrough.

The opening 25 of the spider 23 extends into the roll molding chamber F, and within the other end portion of the roller molding chamber F there is a spider 27, similar to the spider 23, having radiating arms 28, 28 and an opening 29 therethrough.

Within the roll molding chamber 26 there is a steel cylindrical core member 30 having the two extended arms 31 and 32 positioned within the openings 25 and 29 of the spiders 23 and 27, respectively, the core being thus supported by the two spiders 23 and 27; and a cylindrical member 33 having an opening 34 therethrough abuts upon the spider 27.

A cap 35 having an opening 36 therethrough is threaded to the end of the device, and a pipe 37 is threaded into the openings 36 of the cap 35.

The pipe 37 is connected to a vacuum pump (not shown) or other source for producing a vacuum.

The operation of the device for the production of rubber rolls is as follows:

A rubber mix is placed into the supply chamber A and pressure brought upon the mix by the inward movement of the piston 14. The pressure forces the rubber mix through the contraction chamber B, through the expansion chamber C, thence through the diffuser 19, contraction chamber D, expansion chamber E, diffuser 21, spacer 22, and into the roll molding chamber F, within which the mix forms a rubber roll under pressure. The escape of the excess mix therefrom is through the space between the spider arms 28 of the spider 27, the opening 34 of the member 33 and the pipe 37.

During all of this passage of the rubber mix a constant pressure is brought upon the mix by the piston in the supply chamber, while a constant pull is exerted upon it by means of the vacuum pump.

It will be noted that during this entire process the rubber mix is subjected to repeated contractions, expansions and dispersions, thus releasing the entrained air in the mix, which air is drawn off and eliminated by the vacuum pull which is present at all times.

When the rubber roll has been formed, the pipe 37 is disconnected and the cap 35 is disconnected and withdrawn.

That portion of the device forming the molding chamber F, with its included roll, roll core, and two spiders 23 and 27 is then released from the remainder of the device by releasing the threaded collar 38, and prepared for ageing or vulcanizing.

In preparing the thus removed portion of the device for the ageing or vulcanizing treatment, each end of the device is constructed as shown in Fig. 4.

A cylindrical member 40 having a small opening 41 is abutted upon the cylindrical member 33 and a cap 42 having a recess 43 is attached to the device by means of the threaded collar 44, and the entire device thus formed is placed within an ageing or vulcanizing chamber, not shown.

As there is liable to be a slight expansion of the rubber during the ageing or vulcanizing process, such excess of rubber is deposited in the recess 43 of the cap 42.

When the roll has been properly aged or vulcanized it is removed from the ageing or vulcanizing chamber and the several metal elements are removed readily from the roll positioned upon its core, and it is in condition for practical use.

It will thus be noted by the process of my invention, practically all of the entrained air in the rubber mix will be exuded and removed before the rubber mix reaches the molding chamber, and that, therefore, the objectionable features of undue porosity, irregular density and pitted surfaces will be overcome and removed.

I do not limit myself to the particular form of the device, nor to the number or arrangement of parts as illustrated and described, as these may be varied without going beyond the scope of my invention.

What is claimed is:

1. A process for producing rubber printing rolls which comprises the continuous passage in a substantially rectilinear direction of a rubber mix under continued pressure from a supply chamber successively through a smaller chamber and a larger chamber, and thence through a diffuser, thereby causing successive contraction, expansion and diffusion of the rubber mix, passing said treated rubber mix into a chamber having a core therein, thus enclosing said core with an annular coating of said rubber mix, said treated rubber mix being continuously subjected to the withdrawal of inhibited air by suction, and vulcanizing said rubber covered core.

2. A process for producing a substantially air free plastic roll which comprises successively decreasing and increasing the diameter of a plastic roll of material, sub-dividing said increased roll of material into a plurality of filaments of comparatively small diameter, while said material is being urged rectilinearly forward under continuous pressure, and applying suction to the forward end of said moving material, whereby entrained air is removed from the treated material.

3. A process for producing a substantially air free plastic roll which comprises successively decreasing and increasing the diameter of a plastic roll of material, sub-dividing said increased roll of material into a plurality of filaments of comparatively small diameter, compacting said filaments into roll form by further successively decreasing and increasing the diameter of said material, then sub-dividing said roll form into a plurality of filaments of comparatively small diameter, while said material is being urged rectilinearly forward under continuous pressure, and applying suction to the forward end of said moving material, whereby entrained air is removed from the treated material.

CHARLES T. DICKEY.

REFERENCES CITED

The following references are of record in the file of this patent:

UNITED STATES PATENTS

| Number | Name | Date |
|---|---|---|
| 1,283,947 | Steinle | Nov. 5, 1918 |
| 1,320,718 | Steinle | Nov. 4, 1919 |
| 1,560,368 | Bartels | Nov. 3, 1925 |
| 1,745,482 | Goodwin | Feb. 4, 1930 |
| 2,061,918 | Nanfeldt | Nov. 24, 1936 |